United States Patent

[11] 3,578,140

| [72] | Inventors | Caleb H. Myer<br>Columbia;<br>Gregory L. Nicklaus, Lancaster, Pa. |
|---|---|---|
| [21] | Appl. No. | 759,847 |
| [22] | Filed | Sept. 16, 1968 |
| [45] | Patented | May 11, 1971 |
| [73] | Assignee | Kerr Glass Manufacturing Corporation<br>Los Angeles, Calif. |

[54] CLOSURE FEEDING APPARATUS
8 Claims, 6 Drawing Figs.

[52] U.S. Cl. .................................................. 198/33, 221/173
[51] Int. Cl. ........................................ B65g 47/24
[50] Field of Search .................................... 198/33 (R4), 33 (R1), 33 (R3), 41; 221/173

[56] References Cited
UNITED STATES PATENTS

| 1,872,402 | 8/1932 | Candee | 198/33(.4R) |
| 2,665,005 | 10/1954 | Mundy | 198/33(.1)X |
| 3,185,285 | 5/1965 | Runco | 198/41X |
| 3,392,816 | 7/1968 | Cox | 198/33(R1) |

Primary Examiner—Robert G. Sheridan
Assistant Examiner—George F. Abraham
Attorney—Anderson, Luedeka, Fitch, Even & Tabin ABSTRACT: Apparatus for feeding and orienting closure caps. Caps in random arrangement on a rotary disc are centrifugally forced to the periphery thereof where they are plowed off into a single layer. Small magnets in the periphery of the disc hold the outermost row of caps which are fed into a discharge chute in single file. Selector means in the discharge chute allow passage of properly oriented caps and discharges the remainder to an orienting means attached to an opening in the chute directly below the selector means. The orienting means turns the caps and passes them to a magnetic conveyor belt which discharges them, properly oriented, onto the periphery of the rotary disc from which they are again fed into the discharge chute.

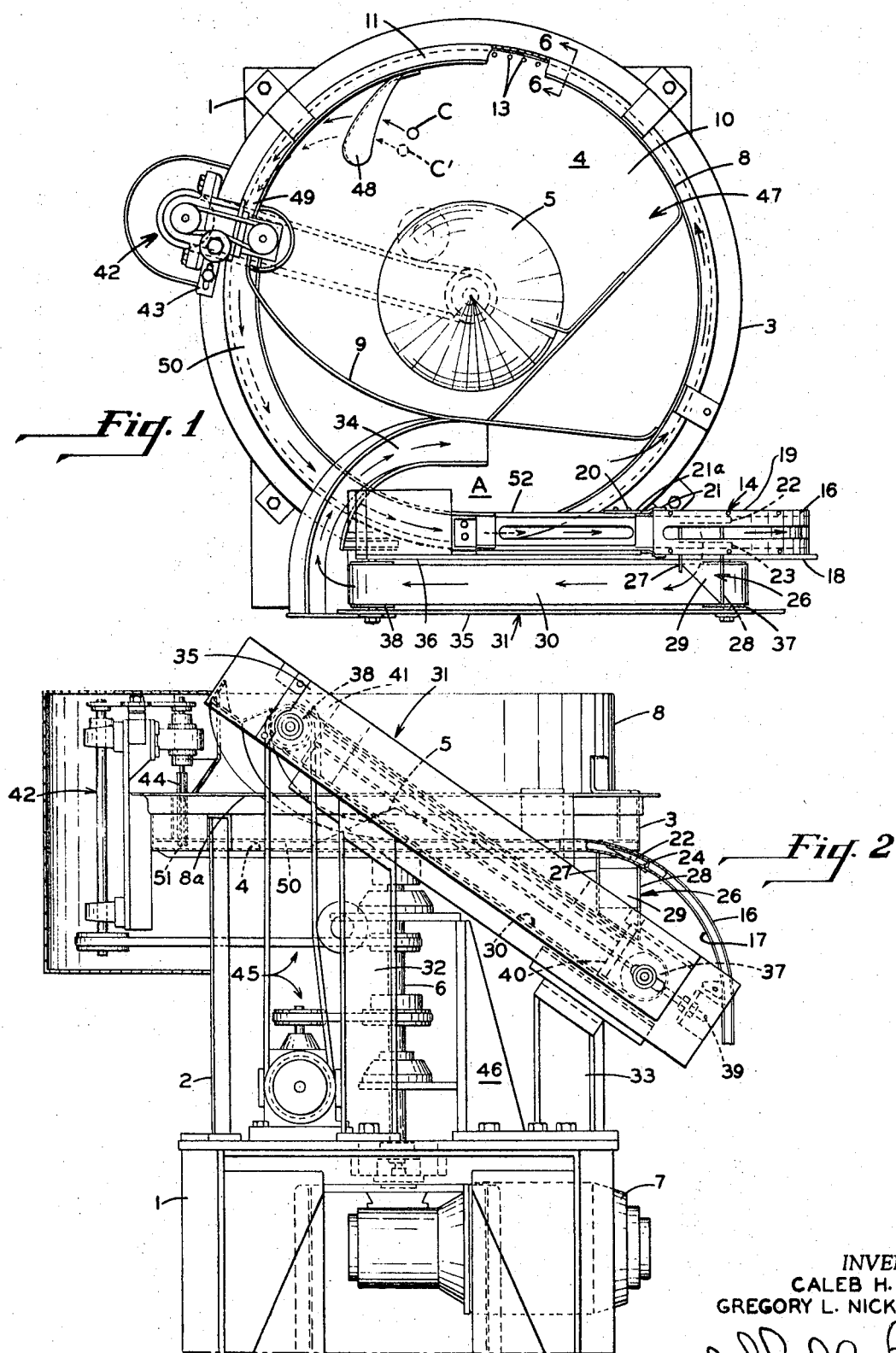

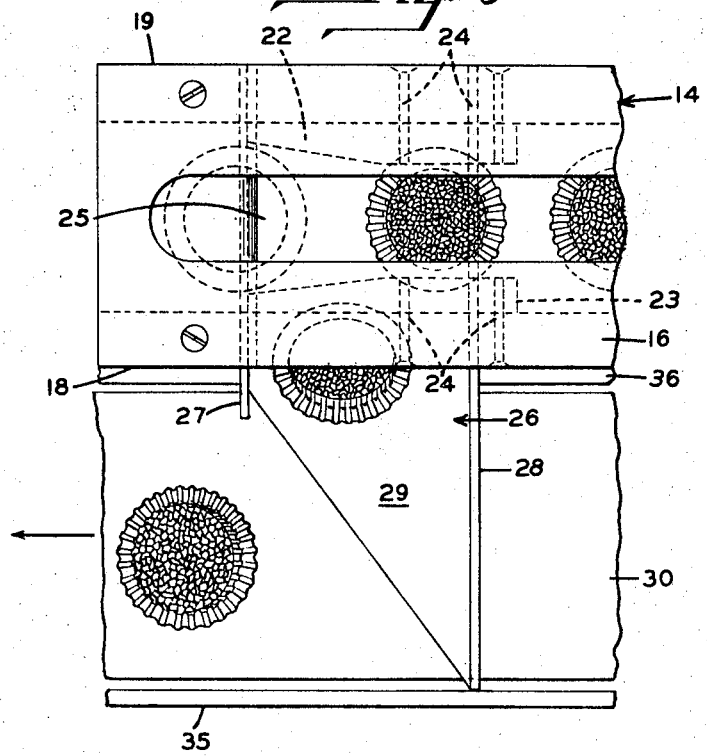
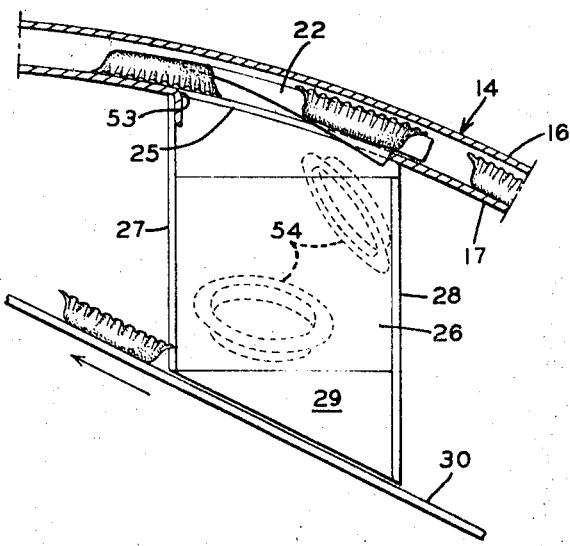

INVENTOR
CALEB H. MYER
GREGORY L. NICKLAUS

ATTORNEY

CLOSURE FEEDING APPARATUS

BACKGROUND OF THE INVENTION

1. Field of the Invention

The present invention involves an apparatus for feeding and orienting closures. More particularly the apparatus relates to a high-speed apparatus for feeding and orienting closures wherein improperly oriented closures are rejected from the feed chute, turned over and placed on a magnetic conveyor belt which deposits them right-side-up on the periphery of a rotating disc for refeeding.

2. Description of the Prior Art

The patents pertinent to this invention are U.S. Pat. Nos. 2,815,148; 2,069,762; 3,265,185; 2,863,588 and 3,269,514.

U.S. Pat. No. 2,815,148 relates to a cap orienting mechanism for caps including a skirted body and a skirt-carried locking lever. In this invention, caps are placed on a rotating disc and are centrifugally forced to the periphery of the disc where they are held in a single line by magnetic inserts and fed in a single file to a receiving and discharging chute.

U.S. Pat. No. 2,069,762 discloses a cap feeding apparatus including a cap receiving chute with diverging passage having grooves in the opposite sidewalls extending at an angle corresponding to the declination of the passage for the engagement of the flared edge of the skirt of the caps to guide them into the appropriate passage. The passages are curved or twisted appropriately so that all caps are arranged right-side-up as they are discharged from the chute.

U.S. Pat. No. 3,265,185 relates to a device for conveying and sorting closure members of the type formed from a metallic top panel provided with a depending skirt portion. The device makes use of a magnetized conveyor means of an arrangement and design permitting high-speed operation to establish and maintain a sufficient supply of selectively sorted caps and feed the same to a capping machine operating at high speed. A cap orienting device is associated with the feed chute for insuring that all the caps delivered to the capping machine are facing in the same direction. A relatively slow speed magnetic belt of a width to accommodate more than a single line of caps picks the caps up from the storage bin. The caps are transferred to a high-speed, single line magnetic conveyor for delivery to the feed chute. Excess caps not accepted by the single line conveyor are returned to the storage bin.

U.S. Pat. No. 3,269,514 relates to a cap feeding and orienting device comprising a hopper for receiving a supply of caps in miscellaneous array and having means in the form of a disc mounted within the hopper for rotation in an inclined plane and having a plurality of magnets spaced about the periphery thereof for holding and delivering the caps in a continuous single line into a discharge chute. The chute has associated with it a rotary orienting device, the latter having magnetic means for sensing the attitude of each cap and means for revolving upside down caps into the proper arrangement for use. An expansible, outside wall assembly is provided on the delivery chute to relieve the pressure in the line of caps in the chute in case of stoppage or slow up in the discharge area.

U.S. Pat. No. 2,863,588 relates to a cap feeding machine including a rotating nonmagnetic disc having spaced concentric rings of magnetic material embedded in one face thereof. A plurality of permanent magnets are mounted on said disc and each of the magnetic rings contact opposite poles on each of the permanent magnets, creating continuous magnetic fields. On face of the disc is partially enclosed by a hopper and caps are attracted and held by the magnetic rings and fed to a cap chute. Cover tilting and twisting means are carried by the chute and axially aligned therewith to effect discharge of all the caps with their covers facing in the same direction.

Various problems have been encountered in the use of distributing and cap feeding machines of the type described in the prior art. When feeding caps directly from a hopper of the type shown in the foregoing patents, there has always been the problem of marring of the decorations on the crowns caused by tumbling of the crowns in the hopper. Also, return of rejected crowns to such a hopper merely submits them to additional damage from tumbling and feeding. Further, where the caps were fed through a discharge chute, or pairs of discharge chutes, as in the prior art, problems of orienting the crowns passing therethrough were encountered. As can be seen by the foregoing facts, it was necessary to use various means in an attempt to segregate the properly oriented crowns from the improperly oriented crowns and those previously used almost inevitably caused a slow up in the flow of crowns through the discharge chute, jam-ups and the like.

It has always been desirable that the foregoing problems should be corrected and the speed of the turntable or feeding disc increased so that greater speed and efficiency could be achieved in the feeding of closures.

SUMMARY OF THE INVENTION

This invention relates to a simplified and improved cap feeding and orienting device capable of more efficient, faster and more dependable operation with less damage to the caps. The device comprises a large disc (approximately 30 inch in diameter) with a cone-shaped center and having a plurality of small magnets inserted in its face around the periphery thereof. The disc is rotated at approximately 60—100 r.p.m. in a horizontal plane. Channel means positioned slightly above the edge of the disc allows passage only of a single row of caps thereunder where they are held by the magnets and fed to a cap chute having a narrow cap conveying channel therein. The cap chute is aligned substantially tangentially with the channel means. Segregating means are provided in the cap chute to assure that only properly positioned caps proceed down the chute. A turning and conveying chute is provided below the segregation means and a magnetic conveyor belt is provided adjacent thereto to receive caps rejected by the segregating means. By means of the chute rejected caps are turned over and placed on the magnetic belt which returns the properly oriented caps directly to the main feed stream on the rotating disc.

This apparatus eliminates the necessity of feeding directly from a hopper or storage bin and the well known problems of damage to the crowns, dust, etc. attendant therewith. Also, since there are no merging lines or other devices to retard the flow of caps from the feed chute the speed of the turntable may be increased and caps fed at a faster rate than heretofore. Greater efficiency is achieved by the simplified combination of the turning chute and the magnetic conveyor belt which deposits the crowns directly back into the feed stream on the disc with approximately 75 to 95 percent of them right-side-up as opposed to returning them haphazardly arranged to a hopper. The caps are fed more efficiently and spend less time on the turntable. This greatly decreases the possibility of damage to the caps.

The general object of the present invention is to provide a simplified and improved cap feeding and orienting device which is dependable and capable of faster and more efficient operation with less possibility of damage to the caps. Other objects and advantages will be apparent from a consideration of the attendant drawings and the following description thereof.

BRIEF DESCRIPTION OF THE DRAWINGS

FIG. 1 is a top plan view of the cap feeding and orienting device;

FIG. 2 is a view in elevation of the device of FIG. 1;

FIG. 3 is an enlarged partially broken away plan view showing a portion of the cap feed chute with caps passing therethrough, the segregating means therein, the cap turning and delivering chute and the magnetic belt for returning rejected caps to the feeding disc;

FIG. 4 is a view in elevation of the device shown in FIG. 3 showing more clearly how the rejected caps are turned and deposited on the magnetic belt;

DESCRIPTION OF THE PREFERRED EMBODIMENT

Figure 5:
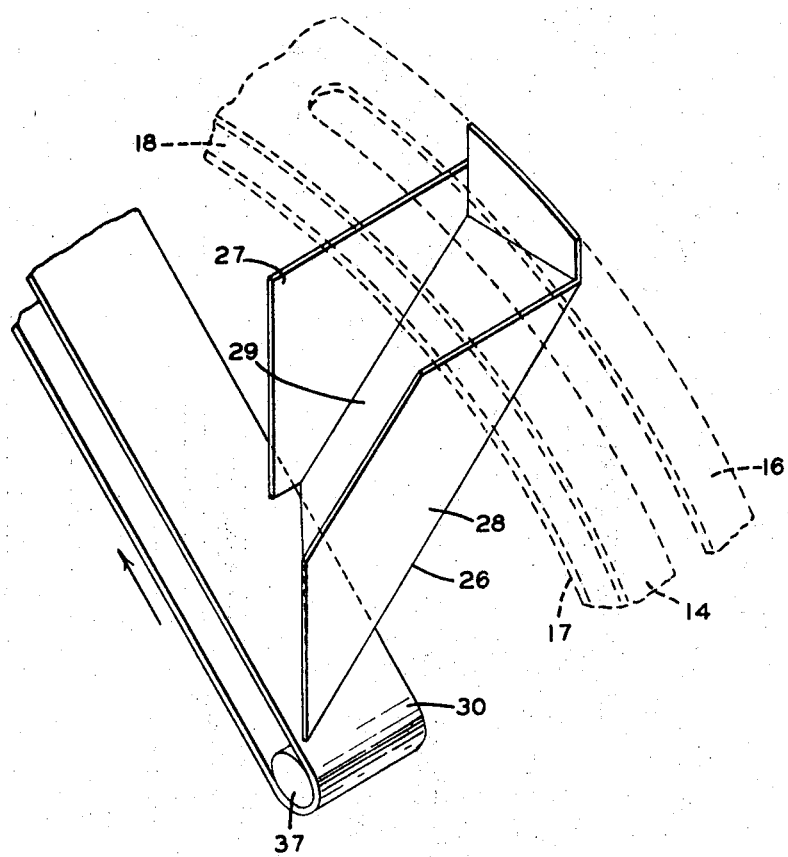
FIG. 5 is a perspective view of the cap turning and delivering chute and the magnetic belt with the cap feed chute shown in dotted lines.

Referring to the drawings, the device as shown in FIGS. 1 and 2 comprises a supporting stand 1 carrying angle from iron members 2 the top portions of which are secured to and support a circular enclosing structure 3 for a turntable 4. The turntable 4 has a centrally located conical portion 5 and is rotatably supported on a drive shaft 6 which is driven by drive means 7 mounted on the stand 1. A turntable hopper 8 is mounted on the circular enclosing structure 3. As best seen in FIG. 1 a dividing member 9 is provided for the hopper 8 to assure that the majority of caps dumped therein remain in the main cap feeding area 10. Attached to the inner circumference of the circular enclosing structure 3 and (See FIG. 6) spaced slightly more than the height of a cap above the edge of the turntable 4 is channel forming member 11. This spacing assures that only a single layer of caps will enter thereunder. In the portion A of the turntable, the hopper sidewall is positioned less than the height of a cap away from the surface of the turntable 4 to assure nonentry of caps in this area.

As shown in FIG. 1, a plurality of small magnets 13 are mounted in the peripheral of the face of turntable 4 as an aid in holding caps thereon in single file.

Figure 6:
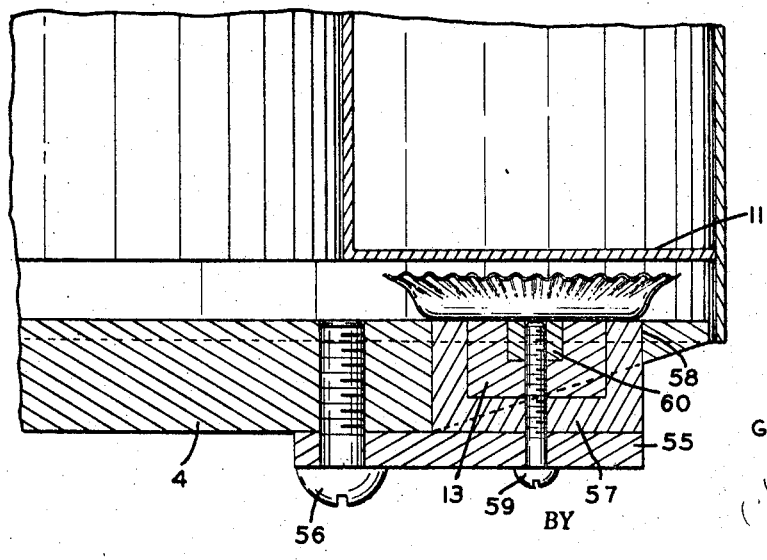
FIG. 6 is an enlarged sectional view taken along line 6—6 of FIG. 1 showing a portion of the rotary disc and one of the magnets in the peripheral portion thereof, a cap held thereon by the magnet and the channel means above the periphery of the disc.

As shown in the enlarged view of FIG. 6, magnets 13 are mounted in the peripheral portion of turntable 4 by means of support plate 55 which is attached to the underside of turntable 4 by fastening means 56. The magnets 13 are supported in nonferrous bushings 57 which are positioned in openings 58 in the peripheral portion of turntable 4 and held therein by fastening means 59 including a lock nut 60. A discharge chute assembly 14 (FIG. 1) is mounted at one side of and tangential to the turntable hopper base 8 a (FIG. 2) and in alignment with the peripheral portion of the turntable 4 enclosed by portion A of the hopper 8 which receives a line of caps from a conveyor discharge chute connected with the magnetic conveyor which returns rejected caps from the discharge chute.

The assembly 14 comprises curved top and bottom members 16 and 17 and side members 18 and 19 and is mounted on turntable enclosing structure 3 by bolts 20 passing through piece 21 and on the discharge chute 14 and piece 21 a on the structure 3. As shown in FIGS. 1 and 2 and to an enlarged scale in FIGS. 3 and 4, segregating elements 22 and 23 are mounted in the discharge chute 14 by means of screws 24. An opening 25 is provided in the bottom plate or wall 17 of chute 14 below the segregating means 22 and 23. Attached to chute 14 below and in alignment with the opening 25 is a cap receiving and turning chute 26 (shown to an enlarged scale in FIG. 5) which extends downwardly at an angle from the chute 14. Chute 26 has side portions 27 and 28 and a bottom portion 29. One side portion 28 of chute 26 and an angularly cut portion of the bottom 29 of chute 26 extends outwardly beyond the side of chute 14 and across the width of magnetic conveyor belt 30.

The conveyor assembly 31 mounted on support members 32 and 33 adjacent to discharge chute 14 extends at an angle of approximately 35° to a horizontal plane from a point below the cap receiving and turning chute 26 to a point above the level of the turntable 4. Conveyor assembly 31 comprises side members 35 and 36, rolls 37 and 38, a magnetic conveyor belt 30 mounted over rolls 37 and 38 and adjusting means 39 for roll 37. Rolls 37 and 38 are mounted on mounting blocks 40 and 41.

A cap deflector assembly 42 is mounted on the side of turntable hopper 8 by means of mounting components indicated generally by the numeral 43. A rotary cap deflector 44 extends downwardly to within a short distance from the surface of the turntable 4 and spaced away from the sidewall of circular enclosing structure 3 a distance sufficient to allow passage of only a single row of caps therebetween.

The turntable 4, the magnetic conveyor belt 30 and the rotary cap deflector 44 are driven by drive means 7 mounted on the support stand 1 through belt and pulley assemblies indicated generally by numeral 45. Drive shaft support brackets 46 are mounted on support stand 1.

In operation of the apparatus, caps are fed by conventional supply means in random arrangement into the supply area 47 of turntable hopper 8. Some of the caps, of course, will have their flange portions facing upwardly and some will be facing downwardly. In FIG. 1, caps with upwardly facing flanges are diagrammatically shown by the solid line circle C. Caps having oppositely facing flanges are indicated by the broken line circles C'. The solid line arrows in FIG. 1 show the path of travel of the caps C having upwardly turned flanges and the broken line arrows show the path of travel of caps C' having downwardly turned flanges.

As the turntable 4 rotates the lowermost caps settle onto the top surface of the turntable 4 and by centrifugal force are moved outwardly and a single line of caps is formed around the peripheral edge of the turnable beneath channel forming member 11. The height of the member 11 above the turntable 4 is such (see FIG. 6) that only a single layer of caps may enter thereunder. A stationary cap deflector 48 is also provided as an aid in maintaining the caps in this area in a single layer. The magnets 13 hold the outermost caps on the turntable 4 as the latter rotates resulting in a line of the caps being advanced to the cap retaining tunnel area 50 located in the portion A of the turntable hopper 4. Rotating cap deflector 44 is positioned at the entrance 49 to the cap retaining tunnel 50. The defector 44 is spaced inwardly from the inner side of the hopper 8 and the edge of turntable 4, a distance sufficient to allow passage of a single line of caps to enter the tunnel 50. The lower end 51 of the rotary cap deflector 44 is of course spaced slightly above the surface of turntable 4. As the caps advance around the turntable 4 they are plowed off into the discharge chute 14 by the portion 52 thereof which extends over the turntable in alignment with cap retaining tunnel 50.

As shown in FIGS. 1, 3 and 4, as the caps flow down the discharge chute 14 some have the flanged portions up and some have the flanged portions down. When the crowns each segregating elements or guides 22 and 23, the caps with the flanges turned upwardly will (as shown in FIGS. 3 and 4) pass on down the chute, while the others will be fed through the opening 25 in the bottom member 17 of the chute 14. As the caps are fed through the opening 25, because of their momentum, gravity and the rounded portion 53 of the opening 25, the caps are partially turned, as shown in FIG. 4 by the dotted illustrations of the caps 54. When they strike the side 28 and slanted bottom portion 28 of the chute 26, this causes a completion of the turning movement of the caps which then slide down the inclined bottom 29 as shown in FIGS. 3 and 4 and are then deposited on the magnetic conveyor belt 30, in the properly oriented position. The caps are then carried in the direction indicated by the arrows in FIGS. 1, 3, 4 and 5 and are deposited in the conveyor discharge chute 34 and returned directly to the peripheral portion of turntable 4 where they will be held by magnets 13 and again fed to discharge chute 14. By the expedient of being able to so place the rejected caps, in properly oriented position, directly back into the feed stream on the turntable, about 75—95 percent of the caps so returned will pass the segregating members 22 and 23 in discharge chute 14 and pass on to the capping mechanism.

By reason of the combined simplified and dependable elements of this invention the speed of the turntable and feeding of the caps and efficiency of the machine are increased while substantially decreasing problems of dust and cap damage normally encountered in the tumbling action occasioned when feeding caps from a hopper as previously done and returning rejected caps to the hopper in random arrangement. The elimination by this invention of merging lines of caps in the discharge chute and the devices required to accomplish the integration of the caps back into a single line for feeding to the capping mechanism further contributes to the ease and efficiency of operation of the machine.

We claim:

1. An orienting device comprising a distributing means for receiving a plurality of articles to be oriented, said distribution means being adapted to place the articles along its peripheral edge due to centrifugal action and to discharge the articles in a single line fashion still in a nonoriented state, conveyor means adapted to receive said single line flow of nonoriented articles, separating means in the conveyor means for separating properly oriented articles from improperly oriented articles, said conveyor means being adapted to discharge the improperly oriented articles in a second direction, means comprising a chute having upstanding side portions and a slanted bottom portion with at least a portion of said bottom and one side extending substantially completely across the width of said receiving and conveying means for said properly oriented articles, said chute being adapted to receive the improperly oriented articles and to properly orient said articles, a magnetic belt extending from a point below and beneath said chute to a point above said distributing means and adapted to receive the last mentioned properly oriented articles and to maintain the articles in their properly oriented position and to return the articles to said distributing means, and a discharge chute positioned to receive said last mentioned articles from said magnetic belt and to convey them to an area of the distributing means separate from the main area thereof so that said articles are fed directly into the feed stream of said distributing means.

2. An orienting device according to claim 1 wherein said distributing means comprises a disc adapted to rotate in a horizontal plane, said disc having a centrally located conical portion.

3. An orienting device according to claim 2 wherein a plurality of spaced magnetic inserts are provided in the base of the peripheral portion of the disc.

4. An orienting device for closures of circular cross section each having a sidewall of at least two different diameters axially spaced from each other, said device comprising means for advancing unoriented closures in a single line with their axes substantially parallel, discharge means for receiving said closures and for further advancing properly oriented closures, said discharge means comprising a first chute having a bottom wall, an opening larger than the largest diameter of said closures located in said bottom wall of said first chute, and separating means extending longitudinally within said first chute and spaced above said opening, said separating means including a pair of guides in said first chute spaced apart a distance less than the largest diameter of said closures and adapted to engage said sidewalls of said closures, whereby closures oriented with the largest diameter below said separating means will fall through said opening due to gravity and closures oriented with the largest diameter above said separating means will be engaged by said separating means and advanced through said first chute.

5. An orienting device as set forth in claim 4 further comprising a centrifugal distributing means adapted to align said unoriented closures along its periphery by centrifugal force and to introduce said closures into said advancing means, and wherein said means for advancing includes a restricted opening into said discharge means so that the closures enter said discharge means in a single line.

6. An orienting device as set forth in claim 5 further comprising a second chute disposed below the opening in said bottom wall of said first chute and extending downwardly therefrom, said second chute being adapted to receive improperly oriented closures and to properly orient them.

7. An orienting device as set forth in claim 6 wherein said second chute comprises three essentially vertical sidewalls and a slanted bottom wall connected to said sidewalls, said walls being adapted to contact unoriented articles as they fall through said opening in said first chute and to properly orient said closures.

8. An orienting device as set forth in claim 7 further comprising a magnetic conveyor positioned below said second chute and adapted to return the reoriented closures to said distributing means for recycling to said discharge means in properly oriented condition.